(12) United States Patent
Braun et al.

(10) Patent No.: US 8,453,665 B2
(45) Date of Patent: Jun. 4, 2013

(54) SELF-ACTING SELF-CIRCULATING FLUID SYSTEM WITHOUT EXTERNAL PRESSURE SOURCE AND USE IN BEARING SYSTEM

(75) Inventors: Minel J. Braun, Akron, OH (US); Ana M. Balasoiu, Akron, OH (US); Stefan I. Moldovan, Akron, OH (US); Gerald W. Young, Tallmadge, OH (US); Joshua D. Johnston, Medina, OH (US)

(73) Assignee: The University of Akron, Akron, OH (US)

( * ) Notice: Subject to any disclaimer, the term of this patent is extended or adjusted under 35 U.S.C. 154(b) by 634 days.

(21) Appl. No.: 12/525,141

(22) PCT Filed: Mar. 17, 2008

(86) PCT No.: PCT/US2008/003499
§ 371 (c)(1),
(2), (4) Date: May 11, 2010

(87) PCT Pub. No.: WO2008/115473
PCT Pub. Date: Sep. 25, 2008

(65) Prior Publication Data
US 2010/0212744 A1    Aug. 26, 2010

Related U.S. Application Data

(60) Provisional application No. 60/894,994, filed on Mar. 15, 2007.

(51) Int. Cl.
*F17D 1/08* (2006.01)
(52) U.S. Cl.
USPC ............... 137/1; 137/340; 137/563; 137/564; 384/100; 384/114

(58) Field of Classification Search
USPC ............... 137/563, 564, 1, 340; 384/100, 114
See application file for complete search history.

(56) References Cited

U.S. PATENT DOCUMENTS 3,110,527 A * 11/1963 Fox ............................... 384/399
(Continued)

OTHER PUBLICATIONS

F.T. Schuller and W.J. Anderson, oepration of Hydrodynamic Journal Bearings in Sodium Temperatures to 800 Degrees F and Speeds to 12,000 rpm, NASA, TN-D-3928, 1967.
J. Hall and R. Spies, Research in the Field of Liquid Metal Lubricated Bearings, Report RDT-TDR-63/4289, Parts 1, 11 111, North America Aviation, 1965.

(Continued)

*Primary Examiner* — Eric Keasel
*Assistant Examiner* — Minh Le
(74) *Attorney, Agent, or Firm* — Renner Kenner Greive Bobak Taylor & Weber

(57) ABSTRACT

The invention includes a method for continually circulating a fluid in a system, in the absence of an external pumping mechanism, by providing a fluid, an active space capable of generating a higher pressure zone and causing a contiguous lower pressure zone, a passive space, and a porous medium disposed between the active space and the passive space, and generating a pressure differential relationship between the active space and the passive space causing the fluid to circulate freely in both directions between the active space and the passive space, across the porous medium, without the aid of an external pumping system, such that the fluid circulation defines a self-acting self-circulating fluid system, and to the system created thereby.

24 Claims, 12 Drawing Sheets

U.S. PATENT DOCUMENTS

| | | | | |
|---|---|---|---|---|
| 4,105,905 | A * | 8/1978 | Barcus | 310/59 |
| 4,486,026 | A | 12/1984 | Furumura et al. | |
| 4,767,223 | A * | 8/1988 | Goodwin | 384/114 |
| 5,713,670 | A * | 2/1998 | Goldowsky | 384/115 |
| 5,877,576 | A * | 3/1999 | CoChimin | 310/418 |
| 5,954,016 | A | 9/1999 | Westerbeke, Jr. | |
| 5,980,648 | A | 11/1999 | Adler | |
| 6,241,392 | B1 * | 6/2001 | Desai et al. | 384/100 |
| 6,437,469 | B1 * | 8/2002 | Davis et al. | 310/64 |
| 6,489,221 | B2 | 12/2002 | Gehrke et al. | |
| 6,513,980 | B2 * | 2/2003 | Okamura et al. | 384/114 |
| 6,547,438 | B2 * | 4/2003 | Shima | 384/100 |
| 6,835,232 | B2 | 12/2004 | Frost et al. | |
| 7,048,444 | B2 * | 5/2006 | Kurimura et al. | 384/119 |
| 7,429,132 | B1 * | 9/2008 | Marussich | 384/114 |
| 7,566,174 | B2 * | 7/2009 | Kurimura et al. | 384/114 |
| 7,896,550 | B1 * | 3/2011 | Pinera et al. | 384/107 |
| 7,918,605 | B2 * | 4/2011 | Brown | 384/100 |
| 2002/0051588 | A1 * | 5/2002 | Koseki et al. | 384/100 |
| 2003/0091249 | A1 * | 5/2003 | Kurimura et al. | 384/100 |
| 2007/0177830 | A1 * | 8/2007 | Satoji et al. | 384/100 |
| 2007/0242908 | A1 * | 10/2007 | Nakajima et al. | 384/112 |
| 2008/0036319 | A1 * | 2/2008 | Chiyoda et al. | 310/90 |
| 2009/0016655 | A1 * | 1/2009 | Nakajima et al. | 384/100 |
| 2009/0074337 | A1 * | 3/2009 | Kashchenevsky | 384/111 |
| 2009/0103841 | A1 * | 4/2009 | Uenosono et al. | 384/100 |
| 2010/0002966 | A1 * | 1/2010 | Hori et al. | 384/100 |
| 2011/0019948 | A1 * | 1/2011 | Hori et al. | 384/114 |

OTHER PUBLICATIONS

R.A. Burton and Y.C. Hsu, Fundamental Investigation of Liquid Metal Lubricated Bearings, USAEC Report SWRI-1228P832, Southwest Research Institute.

P.M. McDonald, Lubrication Behaviour of Liquid Metals, Report WADC-TR-59-764, north Carolina College, 1961.

M.J. Braun, et al., An Analysis of Temperature Effect in a Finite Journal Bearing With Spatial Tilt and Viscous Dissipation, ASLE Transactions, 47:405-411, 1984.

M. Dzodzo and M.J. Braun, Pressure and Flow Characteristics in a Shallow Hydrostatic Pocket with Rounded Pocket/Land Joints, Tribology International, Austrib Special issue, 2.

J.A. Walowit, Users Manual for Computer Code Spiralg, Gas Lubricated Spiral Grooved, Cylindrical and Face Seals. Report NASA, NASA/CR2003-212361, 2003.

Ming-Da Chen, et al., Lubrication of Journal Bearings—Influence of Stress Jump Condition at the Porous-Media/Fluid Film Interface, Tribology International, 35:287-295, 2002.

Abdallah A. Elsharkaway and Lotfi H. Guedouar, Hydrodynamic Lubrication of porous Journal Bearings Using a Modified Brinkman-..I, Tribology International; 34:767-777, 2001.

Jaw-Ren Lin, et al., Hydrodynamic Lubrication of Long, Flexible, Porous Journal Bearings Using the Brinkman Model, Wear, 198:156-164, 1996.

J.A. Tichy, A Porous Media Model for Thin Film Lubrication, ASME Journal of Tribology, 117:16-21, 1995.

* cited by examiner

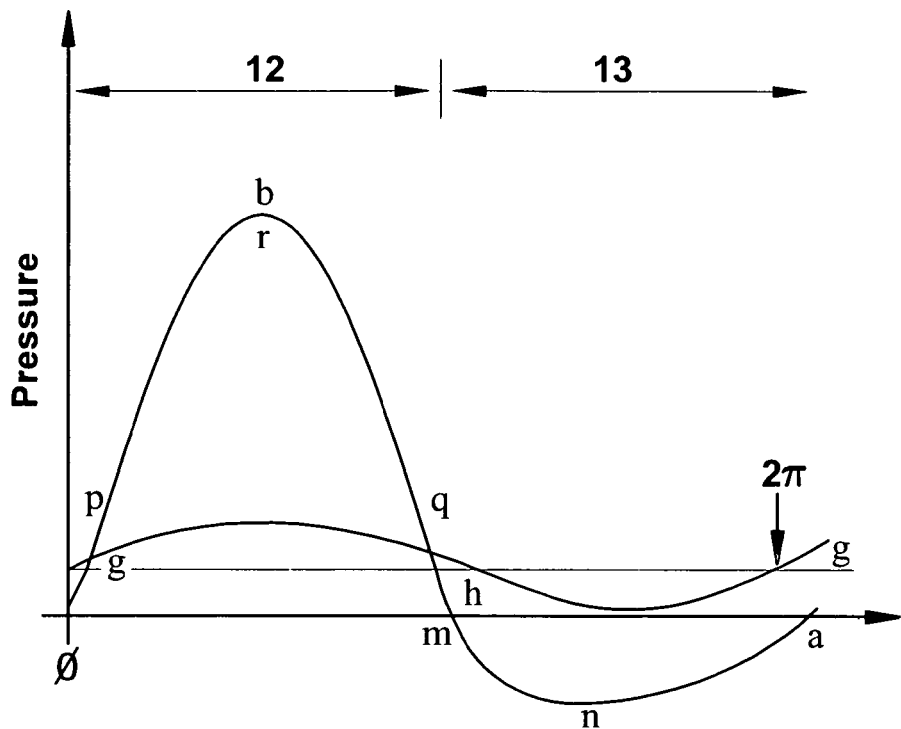
Fig. 3  Circumferential Direction
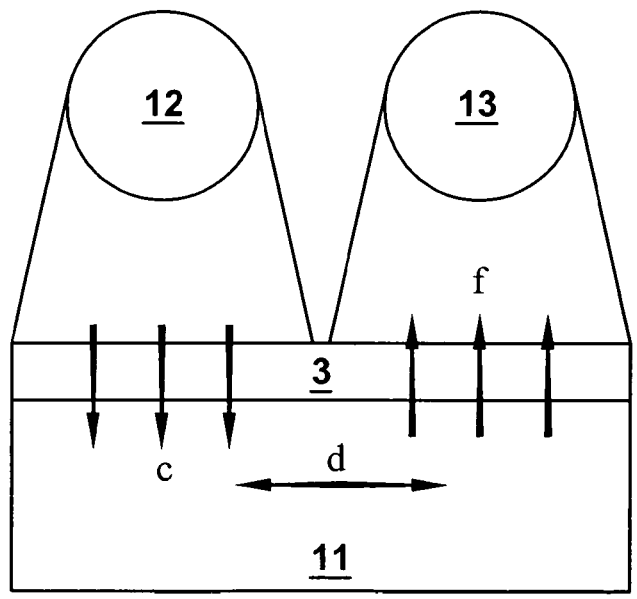
Fig. 4

SELF-ACTING SELF-CIRCULATING FLUID SYSTEM WITHOUT EXTERNAL PRESSURE SOURCE AND USE IN BEARING SYSTEM

The invention relates to a self-acting, zero-leakage closed circulation system without any external pressure creating source, and to a method for operating the system. This system finds particular application to bearing systems, though it is also applicable in other types of systems that would benefit from the capability to continually circulate a fluid therethrough in response to a pressure gradient, and without the need for an external pressure source or pumping system.

BACKGROUND OF THE INVENTION

Fluid circulation systems are used in many industries and vary among these industries. For example, fluid circulation systems find application in mechanical systems ranging from the most rudimentary machines requiring the lubrication and cooling of moving and/or rotating parts, such as small horsepower engine indoor and outdoor equipment, to more complex systems, such as those used, for example, in the automotive industry and in heavy machinery of all kinds, and further to even more complex and highly specialized military and industrial applications that are characterized by high power density. Such systems produce an uncommon amount of power in relatively small envelopes. Some principles underlying the operation of such systems are also used outside those fields where engines are generally considered, and find application, for instance, in the biomedical engineering field. The self-acting system disclosed herein may find application to any of the foregoing fields, and all others that employ such systems, and which will become apparent to one skilled in the art upon reading and understanding the disclosure provided.

Common to the foregoing systems is a moving and/or rotating part that needs continuous lubrication, reduced friction, temperature control and, in general, a means to enhance efficient and smooth movement. Also common to systems having such a moving or rotating part or parts is an external pressure source that delivers lubricant to the system, usually through an external pumping mechanism and including pipes, tubes or other forms of compatible conduit, and withdraws used lubricant from the system in the same manner. The external pressure source and attendant piping represent a cumbersome but necessary addition to the system being supported thereby, and additionally are a source of system breakdown and maintenance needs, thus representing not only an added initial expense of the system, but also an added and continuous maintenance expense. Further, for advanced, more complex systems that operate in extreme environments, or experience extreme operating conditions, i.e. high temperature and pressure, or increased rotational speeds, materials used for these external systems must also be able to withstand these extreme conditions, thereby making them even more costly to obtain, create and maintain.

Without wishing to be bound to any one operating system, and in the interest of providing a merely exemplary system to better demonstrate the pitfalls of existing systems and the advantages to such systems of the inventive self-acting fluid circulation system disclosed herein, the self-acting system will be discussed hereafter at times with reference to the application thereof to a bearing system. More particularly, in order to demonstrate the use of the self-acting system in extreme circumstances, the system may be shown and discussed hereafter with reference to systems employing high operating temperatures, in excess of 1000° C., and under conditions of increased rotational speeds, in excess of 16,000 rpm and as high as 30,000-100,000 rpms. Due to these conditions and parameters, the exemplary system further includes the use of a liquid metal lubricant for reasons which will become apparent in the following disclosure. Notwithstanding the foregoing, it is to be understood that the usage and functionality of the inventive system is in no way limited to the use of liquid metal lubricants or use of the system under extreme conditions, but can be used with any suitable lubricant or fluid, and may further be used at any temperature ranging from ambient to the temperatures mentioned above, and even to cryogenic ranges and systems operating below ambient and under conditions attendant to such temperatures. It will be understood by the skilled artisan, in light of the full disclosure, that the self-acting, zero-leakage fluid circulating system is suitable for use in other systems and that the bearing system discussed is merely one option for its use.

As with most applications where the self-acting, zero-leakage fluid circulation system may find use, known systems, including the exemplary bearing system mentioned above, generally enjoy the use of an external pumping system. Schuller and Anderson, (F. T. Schuller and W. J. Anderson, Operation of Hydrodynamic Journal Bearings in Sodium Temperatures to 800° F. and Speeds to 12,000 rpm, NASA TN-D-3928, 1967), studied hydrodynamically lubricated bearings that used sodium as the working fluid. The bearings studied were designed for working temperatures of up to 800° F. and speeds approaching 12,000 rpm. The sodium supply for the bearing was pumped through a closed loop external circulating system. Other researchers, like Hall and Spies, (J. Hall and R. Spies, Research in the Field of Liquid Metal Lubricated Bearings, *Report RDT-TDR*-63-4289, *Parts I, II, III, North American Aviation,* 1965, Hall et al., Determination of Working Fluid Lubrication Capability in Journal Bearings, *Report ASD-TDR* 62-640, *Parts I, II, WPAFB,* 1963, R. A. Burton and Y. C. Hsu, Fundamental Investigation of Liquid Metal Lubricated Bearings, *USAEC Report SWRI*-1228P832, *Southwest Research Institute*; W. D. Richards, Hydrodynamic Journal Bearing Tests in Lithium, *Report TIM*-915, *Pratt and Whitney,* 1965, and P. M. McDonald, Lubrication Behavior of Liquid Metals, *Report WADC-TR*-59-764, *North Carolina College,* 1960) did fundamental work with regard to the use of sodium and lithium lubrication of bearings for military and space applications. As with the above systems, these latter bearing systems employed external pumping systems. As used herein, the term "external" means outside of or extraneous to the moving part of interest and its housing, and containing a pump actuated by a motor as well as piping systems leading carrying the lubricant to and from such bearings. This pump represents the source of fluid circulation and overall system pressurization.

Similarly, research has advanced with regard to bearing and seal design. See M. J. Braun, R. L. Mullen, and R. J. Hendricks, An Analysis of Temperature Effect in a Finite Journal Bearing With Spatial Tilt and Viscous Dissipation, *ASLE Transactions,* 47:405-411, 1984, and M. Dzodzo and M. J. Braun, Pressure and Flow Characteristics in a Shallow Hydrostatic Pocket With Rounded Pocket/Land Joints, *Tribology International, Austrib Special Issue,* 29, 1996, discussing the application of Reynolds-based and Navier-Stokes-based numerical algorithms to hydrodynamic and hydrostatic bearing design. This research focused on evaluating the effects of temperature, load, speed and geometry on bearing operation. While the relevant body of literature is replete with papers that address the subject of design, construction and operation of self-acting bearings, these references noticeably lack any teaching that shows a combination of such systems with the self-circulating, zero-leakage, high temperature and high rotational speed operating system provided by the inventive system disclosed herein.

The SPIRALG or SPIRALI codes developed by Walowit (J. A. Walowit, Users Manual For Computer Code Spiralg. *Report NASA, Contract NAS* 3-25644, 1992; and J. A. Walowit, Users Manual For Computer Code Spiralg, Gas Lubricated Spiral Grooved, Cylindrical and Face Seals. *Report NASA, NASA/CR*2003-212361, 2003) were tooled to simulate cylindrical and thrust spiral groove bearings and seals. These codes have reached national prominence and are presently widely used. The codes are based on the Reynolds equation and can calculate performance characteristics like load carrying capacity, leakage, stiffness and damping. The Reynolds equation is a very special form of the continuity equation that when incorporating the momentum equation provides a conservative equation that balances the external forces and the viscous forces acting on a fluid in motion, and is the fundamental equation of bearing lubrication.

In addition to the foregoing, the technology of porous bearings, but without a combination with a fluid reservoir as proposed by the inventive system disclosed herein, is well-known. This technology in fact uses an external pumping system to feed fluid through the porous medium to the bearings. See, for example, Ming-Da Chen, Kuo-Ming Chang, Jau-Wen Lin, and Wang-Long Li, Lubrication of Journal Bearings—Influence of Stress Jump Condition at the Porous-Media/Fluid Film Interface, *Tribology International,* 35:287-295, 2002; Abdallah A. Elsharkaway and Lotfi H. Guedouar, Hydrodynamic Lubrication of Porous Journal Bearings Using a Modified Brinkman-Extended Darcy Model, *Tribology International,* 34:767-777, 2001; and Jaw-Ren Lin, Chi-Chuan Hwang, and Rong-Fuh Yang, Hydrodynamic Lubrication of Long, Flexible, Porous Journal Bearings Using the Brinkman Model, *Wear,* 198:156-164, 1996. In classical most practiced cases, the porous medium is used as a fluid transfer medium through which an external oil supply is pumping fluid into the bearing. There are, however, low speed, low temperature systems today where it is undesirable or impractical to deliver external fluid. Such systems may be self-lubricating, however they are not porous nor do they exhibit the use of a closed loop self-circulating system per the current teaching provided herein. See Boston Bearing/Boston Gear, 2000 Catalogue. In some of these cases, as the journal moves and creates a pressure gradient, the fluid from inside the porous layer and/or channel is drawn into the fluid film, further enabling lubrication. Noticeable, however, is the lack of a means to exchange fluid between an external reservoir and the bearing space, or a means for fluid to circulate between the active space of the bearing and the passive space of the reservoir continuously as is present in the inventive system provided herein. Novel to the invention is a closed loop circulation system where fluid circulates continuously between the active and passive spaces of the bearing system without ever being removed by or to and external pumping mechanism. See also J. A. Tichy, A Porous Media Model For Thin Film Lubrication, *ASME Journal of Tribology,* 117:16-21, 1995, showing that a slider bearing modified to include a porous medium increases the load-carrying capability and reduces the friction coefficient.

Even though the current state of the art with regard to bearings has made some advances, there has been no effort made nor has art become available teaching one how to combine various aspects of such advances to improve bearing performance under self-circulating, zero-leakage, high temperature, high rotational speed conditions. Such a lack is in part due to the design nuances that inhibit combination of the features mentioned in a straight forward manner; i.e., combination requires a balancing of principles and design so as address inherent problems encountered in combining such systems. Bearing systems remain complicated to operate and maintain with respect to the use of pumping and piping equipment to feed and remove lubricants necessary to the efficient operation of the bearing system. In addition, current lubricant systems are not well suited for high temperature applications, beyond the working temperatures of the lubricant and the few that may find application at high operating temperatures, such as the sodium and lithium lubricants mentioned earlier, have been long ago abandoned for a variety of reasons, including environmental, technical and financial issues.

The foregoing establishes that it is known in the art to: provide a shaft and a stationary enclosure for use as a bearing system; that the stationary enclosure may be porous; that the fluid may be held in a reservoir; and that systems employing the foregoing advances are used with external pumps to provide fluid to the system. Nothing in the current state of the art, however, provides for or even suggests that a system, without an external pumping mechanism, that is a self-acting, self-circulating, no pump system that can function infinitely timewise if leakage is substantially eliminated can be constructed. In short, the art lacks any teaching to the elimination of the external pumping mechanism while maintaining a fully functioning system that is, in addition, self-acting and self-circulating as defined herein.

What is needed is a self-acting, self-circulating fluid system, capable of moving a fluid through the system in response to a pressure gradient created within the system and without the use of an external pressure mechanism or fluid supply and removal equipment.

SUMMARY OF THE INVENTION

In one aspect, the invention includes a method for continually circulating a fluid, in the absence of an external pumping mechanism, the method including: providing a fluid; providing an active space capable of generating a higher pressure zone and causing a contiguous lower pressure zone; providing a passive space; providing a porous medium disposed between the active space and the passive space; and generating a pressure differential relationship between the active space and the passive space causing the fluid to circulate freely in both directions between the active space and the passive space, across the porous medium, without the aid of an external pumping system, such that the fluid circulation defines a self-acting fluid circulation system.

In another aspect of the invention, a self-acting fluid circulation system includes a fluid, an active space exhibiting a higher pressure than a contiguous passive space in at least a portion of the active space; and a porous medium disposed between the active space and the passive space; such that the fluid is forced from the active space to the passive space through the porous medium, in the active space portion exhibiting higher pressure, and then flows freely back into the active space from the passive space in the portion not exhibiting higher pressure as compared to the passive space.

In still another aspect, a self-acting bearing system comprising of an enclosure having a shaft residing therein, the enclosure comprising a porous medium; an active space defined between that surface of the enclosure facing the shaft and that surface of the shaft facing the enclosure; a reservoir contiguous to and surrounding the enclosure and defining a passive space; and a lubrication fluid residing in the active space and in the passive space that passes through the porous medium in both directions in response to a pressure gradient between the active space and the passive space; the self-acting bearing system being devoid of an external pressure source.

In still another aspect, a self-circulating, zero-leakage system is provided wherein both the active and passive spaces include active and passive seals to limit the leakage of the circulating fluid out of the active or passive spaces and thus to limit significantly any necessity for human intervention for maintenance purposes or otherwise.

BRIEF DESCRIPTION OF THE FIGURES

The following Figures are provided to aid the understanding of one skilled in the art with respect to application of the inventive system provided herein and the operation thereof. As such, they are not intended in way to limit the invention to only those systems exemplified. In the Figures, like numbers are used throughout to refer to the same parts though shown in various aspects and/or in various figures.

FIG. 3 is a graph of the pressure gradient in a system according to the invention.

FIG. 4 is a flow chart depicting fluid flow in a system according to the invention.

DETAILED DESCRIPTION OF THE INVENTION

Figure 1:
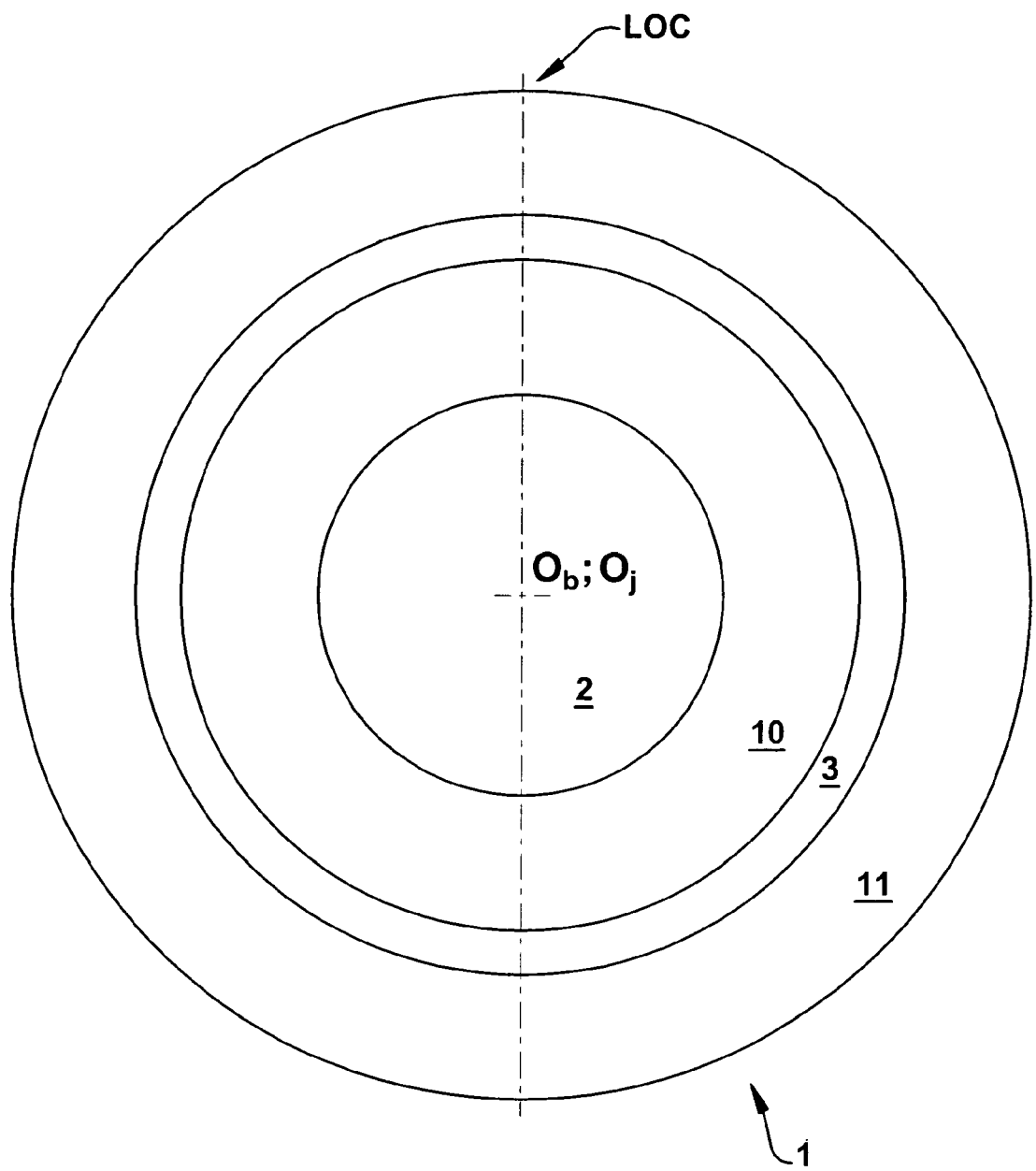
FIG. 1 is shows a cross section of a system according to the invention at rest.

The invention relates to a self-acting, closed, self-circulating system without any external pressure creating source, and to a method for operating the system. The system exhibits zero-leakage with respect to the lubricating fluid used therein. This system finds particular application to bearing systems, though it is also applicable in other types of systems that would benefit from the capability to continually circulate a fluid there through in response to a pressure gradient, and without the need for an external pressure source or pumping system. In addition, due to the self-lubricating, self-circulating, zero-leakage features of the system, it lends itself readily to miniaturization which greatly benefits any larger system incorporating the current circulation system.

As used herein, the term "fluid" may refer to a gas or a liquid, within the conventional use of the term in the sciences, and refers to all such materials unless otherwise limited herein.

The term "self-acting" as used herein refers to the capability of the system to create pressure through its own motion and without the addition or input of pressure made available by an external pumping system, i.e., without any external source or mechanism for creating pressure or circulating fluid. The actions of "self-acting" and "self-lubricating" are connected and may be used in conjunction with each other herein.

As used herein, the term "self-circulating" refers to the capability of the system to provide movement of the lubricating fluid between the active and passive spaces thereof without the use of an external means of circulation, and rather through the self-acting mechanism defined above.

The term "self-lubricating" as used herein refers to the capability of the system to provide, without the use of an external source or input of lubricant, lubrication for the system through the self-acting mechanism.

The term "zero-leakage" as used herein refers to the capability of the system to substantially reduce leakage rates as compared to industry accepted leakage rates, while still assuring safe operation for the time period prescribed by industry standards for a given system between maintenance or service periods.

The term "active-space" as used herein means a space wherein the pressure profile of the space is higher with respect to a contiguous passive space, such that the pressure profile forces fluid residing in the active space to move to the contiguous passive space, such pressure having been created by the self-acting mechanism defined above.

The term "passive space" as used herein means a space containing a fluid and wherein the fluid moves into and out of the passive space under the influence of the pressure profile created by a contiguous, active space.

In one aspect, the invention relates to a method for continually circulating a fluid in the absence of any external pressure and/or pumping mechanism. This self-acting system includes at least a fluid, an active space, a passive space, and porous medium. The method involves circulation of the fluid between the active space and the passive space, across or through the porous medium, in response to the influence of a self-created pressure gradient. In addition, seals are provided as necessary to perpetuate the system operation without the need to replenish the working fluid from an external source.

In a further aspect, the active space includes a moving component. For example, if the method is applied to a bearing system, the bearing shaft or journal will be the moving component. Similarly, other systems where the method finds application include a moving component. Generally, this moving component requires the presence of a fluid, in some aspects to lubricate the moving component, this fluid acting as a medium through which pressure is created and transmitted. The moving component may move, for example, rotationally or translationally. The moving component has an outer perimeter defining an outer surface and resides within the active space. For example, this is shown in FIG. 1, which shows a system 1 according to the invention, at rest. System 1 includes shaft 2 concentrically located within active space 10. Surrounding active space 10 is porous medium 3, which is in turn surrounded by passive space 11. It is noted that passive space 11 may at times be referred to herein as a reservoir. The geometric center $O_b$ of the assembly or system 1 is also the geometric center $O_j$ of the shaft 2 when the system is at rest. Both $O_b$ and $O_j$ are located along the line of centers (LOC).

Figure 2:
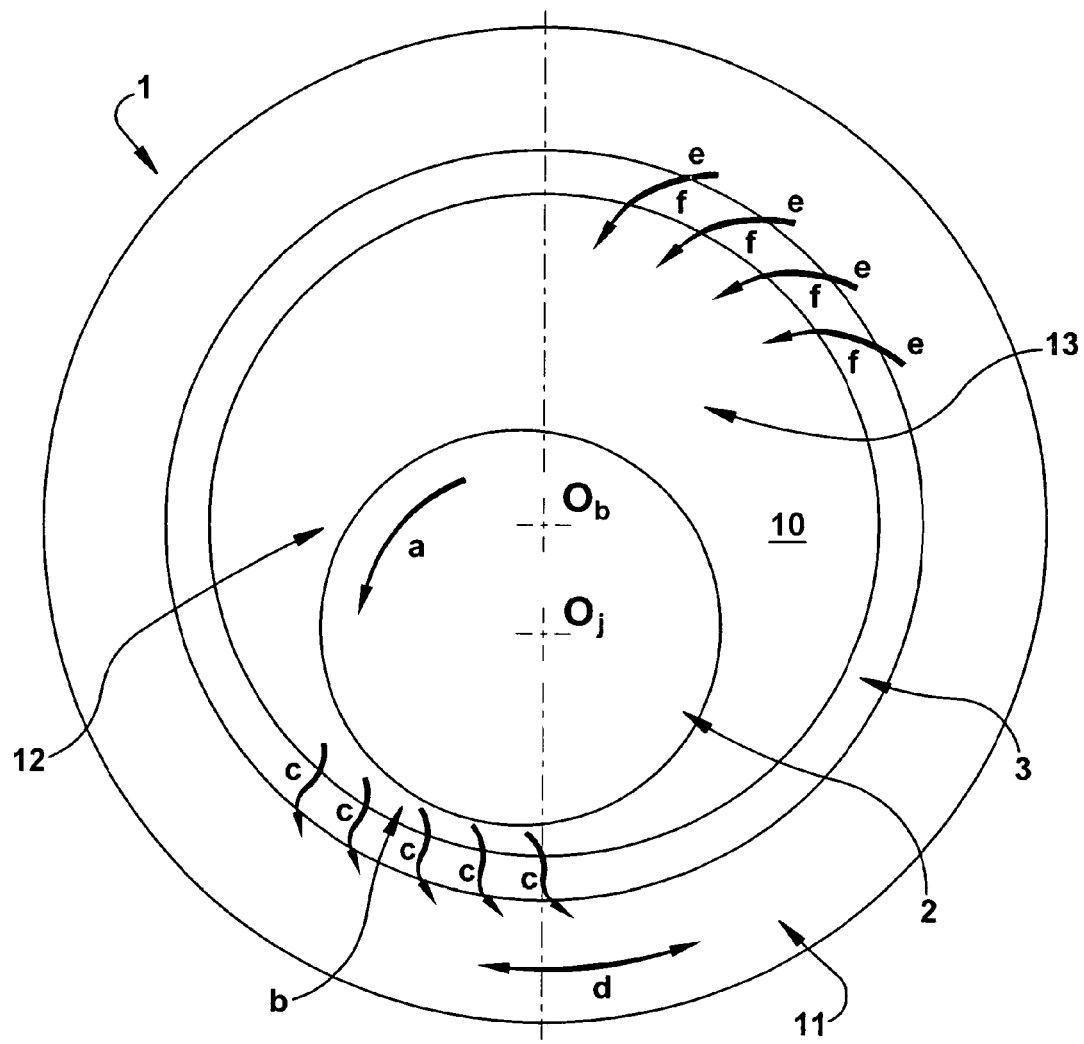
FIG. 2 is shows a cross section of a system according to the invention under load.

FIG. 2 illustrates the same system or assembly 1 shown in FIG. 1, but under a load and with shaft 2 in rotational motion in the direction of arrow a. It is noted that for purposes of clarity the Figures depict a circular system, though other, alternative shaped systems may be used. Now, with regard to FIG. 2, this Figure illustrates the eccentric center $O_j$ of shaft 2 which represents the lowering of the concentric position to an eccentric position in response to the presence of a load. In FIGS. 1 and 2, active space 10 is bordered by porous medium 3, the inner surface of which surrounds or faces the moving component, which in these Figures is shaft 2. The space defined between the outer surface of the moving component 2 and the facing, inner surface of the porous medium 3 defines the extent of the active space 10. Movement of the moving component 2 within the active space, when positioned in an eccentric position $O_j$ with respect to the geometric center of the system $O_b$, generates or creates pressure within the active space 10. Contiguous to the active space 10, and on the opposite side of the porous medium 3 from the active space is a passive space 11. The passive space has an inner surface, created by the porous medium 3, and an outer surface created by the stationary housing of a reservoir (shown as 4 in FIGS. 6-10). The interior of the reservoir then becomes the passive space 11. The passive space lacks any moving component, but contains a quantity of lubricating fluid that fills it completely. Further, the pressure within the passive space 11 relates at all times to the pressure in the active space 10 by mimicking its trends, as shown in FIG. 3 by comparison of the curves p-r-q and m-n-o with g-h-g.

Also shown in this FIG. 2, and with further reference to the graph presented in FIG. 3, are convergent region 12 and divergent region 13 created by the eccentric position of shaft 2. In convergent region 12, as pressure increases in response to the presence of the load and the rotation of shaft 2, this positive driving pressure forces fluid from the active space 10 through the porous medium 3 into the passive space 11 along the path of arrows c. In convergent region 12 pressure increases along line p-r shown in FIG. 3, to achieve a maximum pressure in the system in the area b. Pressure curve g-h shown in FIG. 3 is associated with convergent region 12 and is always below the curve defined by p-r-q. This pressure relationship causes the fluid to move from convergent space 12 along path c through the porous medium 3 into passive space/reservoir 11. Once the fluid moves into passive space/reservoir 11, it circulates in the direction shown by arrow d to areas of lower pressure in reservoir or passive space 11, shown in FIG. 3 as line g-h-g. The lowest pressure in passive space/reservoir 11 is in the area e, shown as line h-g in FIG. 3, where the fluid naturally seeks to flow back into active space 10 along the path of arrows f to satisfy continuity and mass conservation in the system. Pressure curve h-g is higher in region e than the pressure in active space 10 of the bearing, shown as line m-n-o in FIG. 3, ensuring fluid flow along the path of arrows f. This situation results in the system or assembly 1 being self-lubricating, self-circulating and self-acting, all as defined hereinabove.

FIG. 4 provides a simplified flow diagram associated and coordinating with the discussion of FIG. 3 and depicting the path of fluid circulation. It is noted that the numbers and letters used in this flow chart are consistent with those used in FIGS. 1-3 and represent the same spaces and directional relationships with regard to fluid flow.

Figure 5:
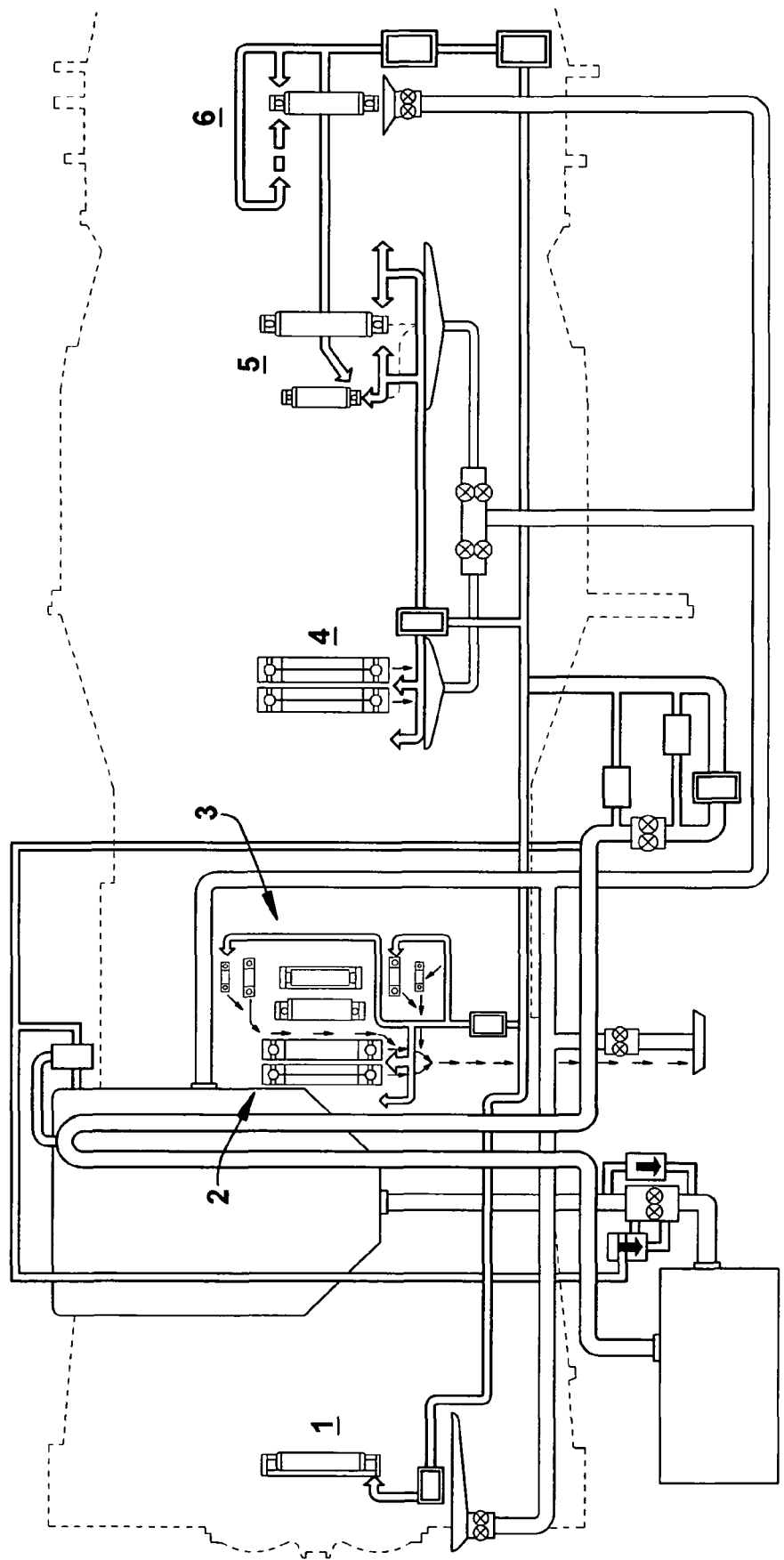
FIG. 5 is a schematic of a prior art system with external pumping means.

As explained above with reference to FIGS. 1-3, no external pressure or pumping mechanism is provided, "external" having been defined herein above. Such an external system is shown in FIG. 5, depicting a generic prior art lubricating system as used for a jet engine. In this case, for example, the lubricating system shown includes six sets of bearings, numbered 1 through 6. In order to support operation of all six sets of bearings, an extensive arrangement of piping lay-out, filters, sumps and pumps is needed. The associated causes for malfunction and related costs in maintenance in this system design are numerous. In contrast, the self-acting self-circulating fluid system disclosed herein replaces this prior art system, eliminating the need for an external circulating system, and thus removing the many potential causes of malfunction and costly maintenance such an external system represents.

Without wishing to be bound to any one operating system, and in the interest of providing a merely exemplary system to better demonstrate the pitfalls of existing systems and the advantages to such systems of the inventive self-acting self-circulating fluid system disclosed herein, the system will be discussed hereafter with reference to the application thereof to a bearing system. It is noted that any system that is properly calculated to maintain the functionally required pressure drops between the active and passive spaces can function as a self-lubricating, self-circulating fluid system. More particularly, use of the self-lubricating, self-circulating fluid system, which is well suited for use in extreme circumstances, is shown and discussed with reference to systems employing high operating temperatures in excess of 1000° C., and under conditions of increased rotational speeds in excess of 16,000 rpm, and as high as 30,000-100,000 rpms. Due to these conditions and parameters, for reasons which will become apparent in the following disclosure, the exemplary system further includes the use of a liquid metal lubricant, though it can be applied to any other suitable lubricating fluid, and used at lower temperatures and rotational speeds. It will be understood by the skilled artisan, in light of the full disclosure, that the self-acting self-circulating fluid system is suitable for use in a variety of systems and that the bearing system discussed is merely one option for its use.

In one aspect of the invention, the self-acting, self-circulating fluid circulation system and method may be applied, to a bearing system operational at high temperatures in excess of 1000° C. and at increased rotational speeds of 30,000 to 100,000 rpms. The bearing system exemplified employs gallium in the liquid state as the lubricating fluid. Gallium becomes liquid at 29.9° C. and remains in this state until it reaches it's boiling point of 2204° C. Grease and oil, traditional lubricating fluids, suffer from the potential to flash and ignite at high temperatures, in excess of 200° C. and above, rendering them useless at temperatures far below the 1000° C. operating temperature of this exemplary system. Gallium, however, due to its very high boiling point, provides a bearing system lubricant that can function safely over a large temperature range, certainly well in excess of 1000° C. The low vapor pressure of gallium also makes it environmentally non-hazardous, which contributes to its attractiveness as a lubricating fluid. With the bearing system at rest, gallium is in a paste-like solid state. As heat is generated in the bearing system by operational function or by an external heat source, the gallium quickly heats up and transitions to the liquid state, undergoing continued decrease in viscosity as the temperature within the system increases.

Table 1 details the physical properties of gallium, and for reference, indium and also sodium, which was a metal preferred in the 1960's and 1970's for liquid lubrication purposes. Table 1 sets forth the advantages of the choice of gallium as opposed to indium or sodium as the lubricating fluid for use in the bearing system when used for high performance, high temperature applications. As an alternative, gallium may be used in combination with indium. Sodium, however, due to its alkaline properties, presents problems in handling, is environmentally hazardous, and has a much lower boiling temperature than gallium, thus reducing the advantages gained by using gallium.

TABLE 1

Pertinent Physical Properties of Lubricants

| Substance | $T_{melting}$ °C. | $T_{boiling}$ °C. | Heat of Fusion Cal/g | Sp. Heat Cal/g · C. | Viscosity cP | Surface tension Dyn/cm |
|---|---|---|---|---|---|---|
| Gallium | 29.92 | 2204 | 19.16 | 0.082 up to 200° C. | 1.894 @ 52.9° C. 0.6524 @ 806° C. | 735 @ 30 to 50° C. |
| Indium | 156.4 | 2092 | 6.807 | 0.0652 | | 340 @ 170 to 250° C. |
| Sodium | 97.8 | 883 | 27.05 | 0.30-0.33 @100 to 800° C. | 0.686 @ 107° C. | |

Figure 6:
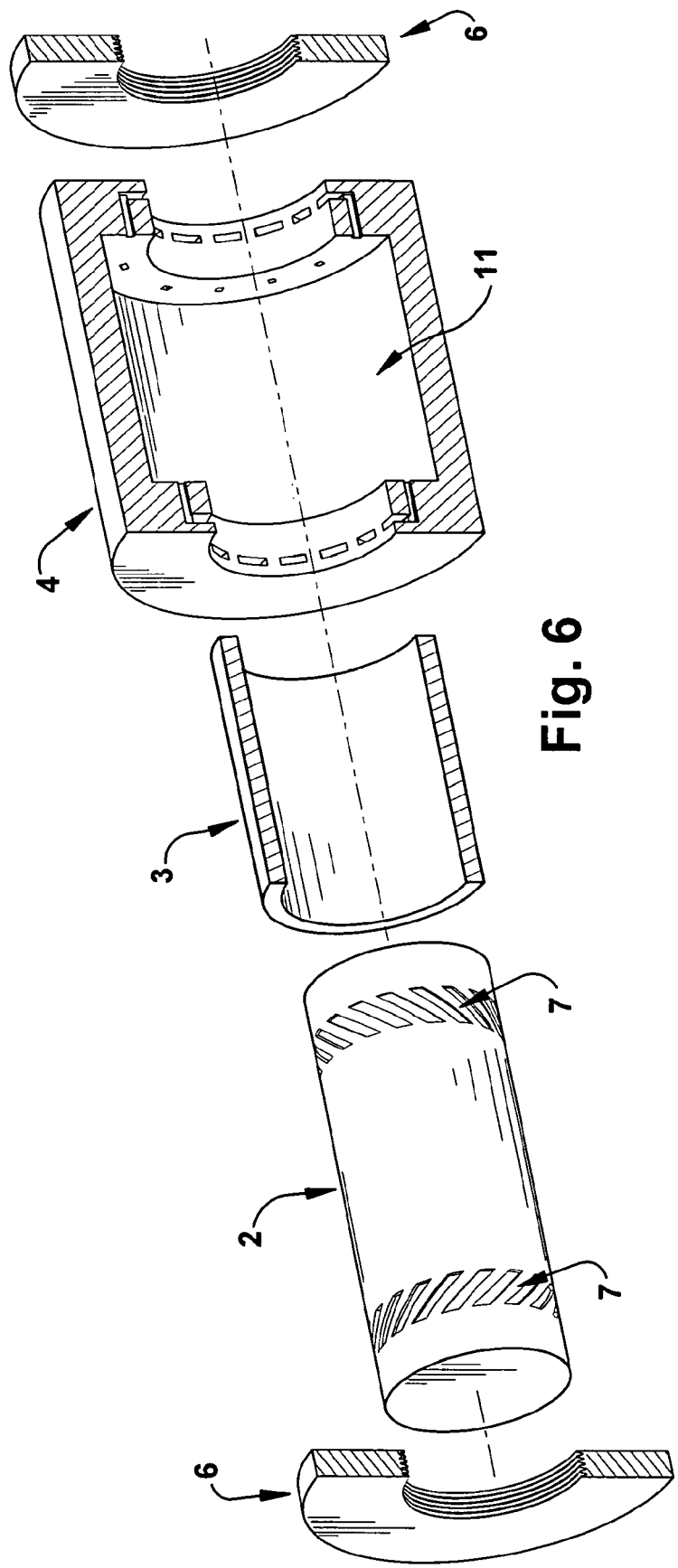
FIG. 6 is an exploded solid model view of a bearing system according to the invention.
Figure 7:
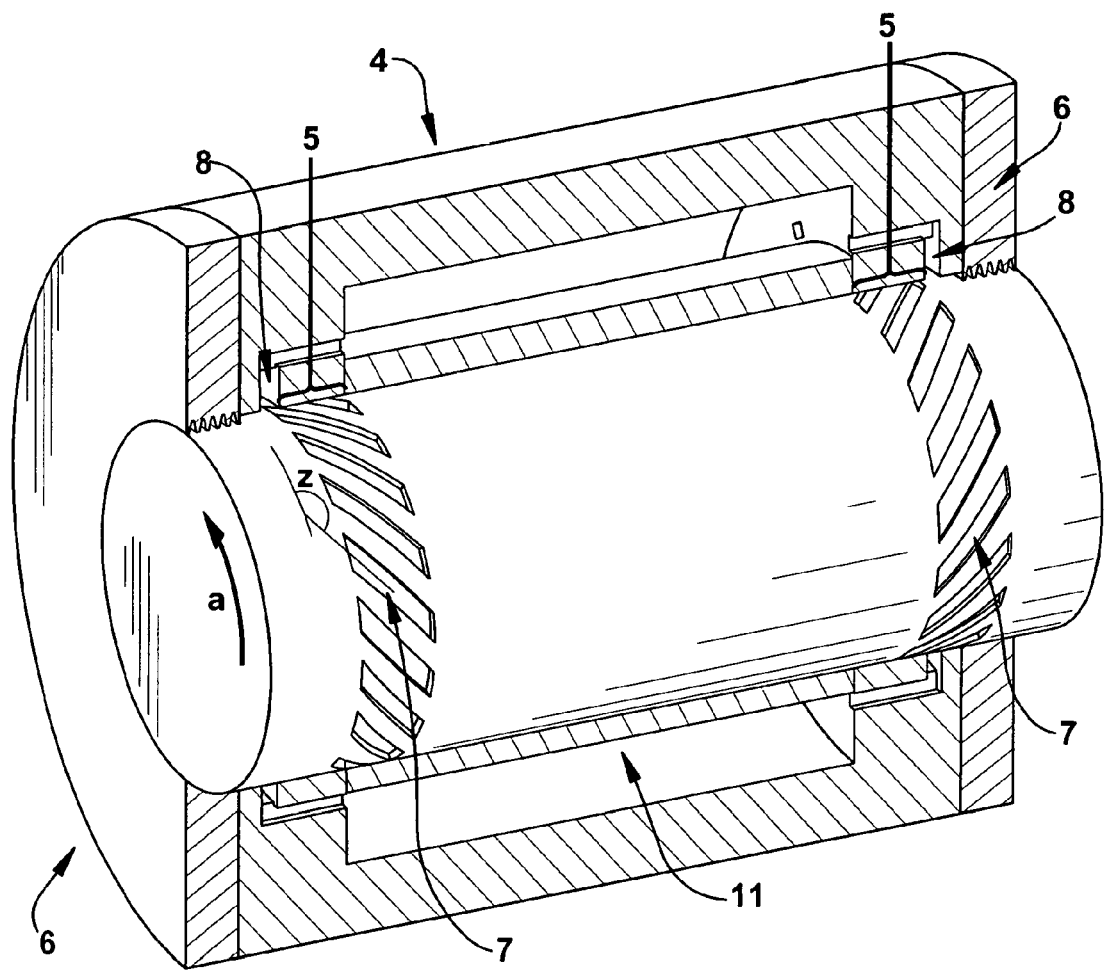
FIG. 7 is a longitudinal cut-away illustration of a bearing system assembly according to the invention.

Various illustrations of a bearing system according to one or more aspects of the invention are shown in FIGS. 6-13. With reference to FIG. 6 an exploded view of the self-lubricating bearing system according to one aspect of the invention is provided. The assembled configuration of the bearing is shown in FIG. 7 where the front half of the assembly has been removed. Both Figures show four working elements. The central section that forms the actual porous bearing contains the porous medium 3 which may be smooth and is a stationary surface that faces the rotating shaft 2; the assembly of 3 and 2 forms the primary hydrodynamic load carrying mechanism. In one aspect, there are two axial sections of the rotating shaft 2 contain herringbone grooves 7. Also shown is stationary housing 4. The assembly of elements 4 and 2, including grooves 7, forms the herringbone groove pumping seal (HGS). Stationary housing 4 has smooth surfaces 5 where it meets HGS grooves 7. When shaft 2 is rotating, grooves 7, operating in conjunction with smooth surfaces 5, cause any fluid which may travel axially outward to channel back into the passive space/reservoir 11, or back into the active space/convergent space 10, 12.

The porous medium 3, while shown in the accompanying Figures to be of equal thickness throughout, may be constructed to have varying thicknesses to enhance transfer of the fluid there through. In addition, the porous medium 3 may exhibit a circumferential variation in porosity according to a predetermined rule regarding a particular system. The porous medium 3 may be comprised of any material that allows continuous circulation from the active to passive spaces and than back to the active space. This material is optimally designed such that the pressure created in the active space is more than sufficient to overcome the pressure drop incurred by the passage of the fluid through the porous medium, as has been discussed above. The porous material may be isotropic and anisotropic. The porous material may provide porosity through a distribution of parallel capillary type channels. This type of material is considered isotropic, and allows fluid to flow only in the radial direction. With this material, the permeability in the circumferential direction is zero. As an alternative, for example, an amorphous sintered, machinable porous material which allows fluid flow in all directions may be used. This type of material can be much easier to fabricate, can be easily machined and polished, and is generally significantly cheaper to prepare and use than the capillary type surface. The sinterized material, with a random pore orientation, represents an anisotropic configuration.

With reference to FIG. 7, the herringbone grooves 7 are laid at an angle z, obtuse with the direction of rotation a of shaft 2, and thus provide the inward fluid pumping action. The pressure generated by this seal creates a pressure gradient opposed to that created by the bearing, and forces the fluid back into the active space/convergent space 10/12 or into the passive space/reservoir 11 through collecting manifolds 8, shown clearly in FIG. 11. In addition, the herringbone grooves add to the load carrying capacity of the system by creating pressure as the fluid circulates back toward the active space.

Figure 8:
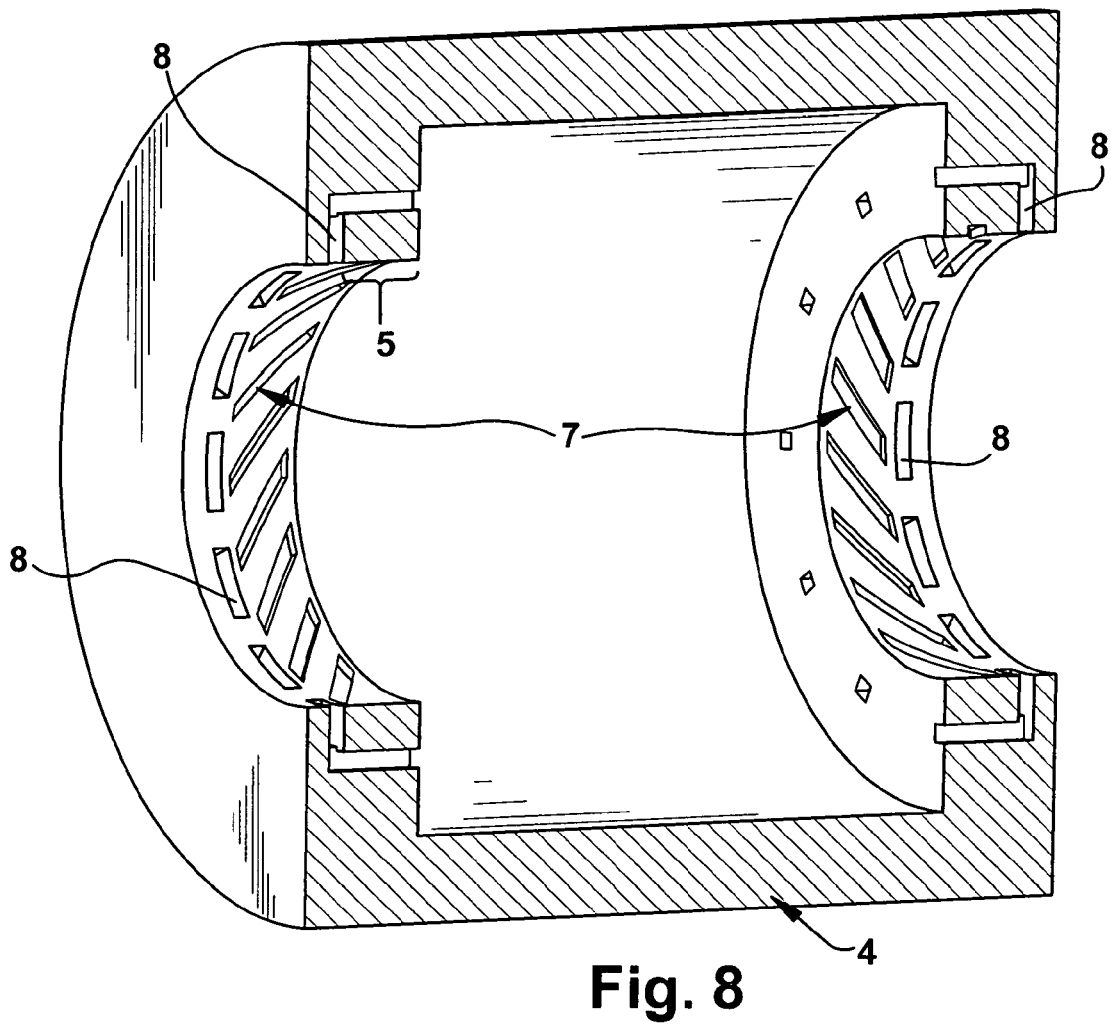
FIG. 8 is a longitudinal cut-away illustration of a bearing assembly having stationary placed HGS grooves according to the invention.
Figure 9:
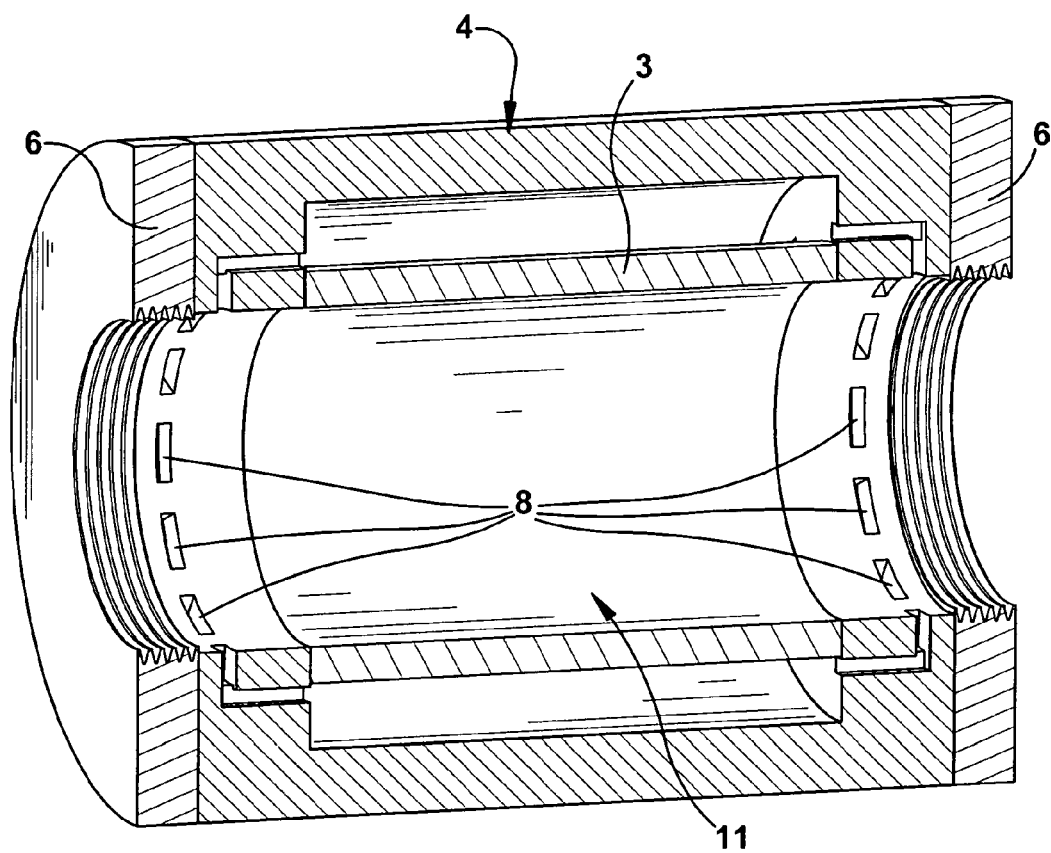
FIG. 9 is a longitudinal cut-away illustrating fluid collecting manifolds in a bearing system according to the invention.

In another aspect of the invention, the HGS grooves 7, consisting of finely cut channels, can alternatively be placed on the stationary housing surface 4 replacing smooth surfaces 5. This arrangement is shown in FIG. 8, wherein the portions of shaft 2 mating with grooves 7, which are now cut in stationary housing 4, will be smooth. Regardless of their placement, the HGS grooves 7 may be formed by any conventional means, including die cutting, laser ablation, and many other methods.

Figure 10:
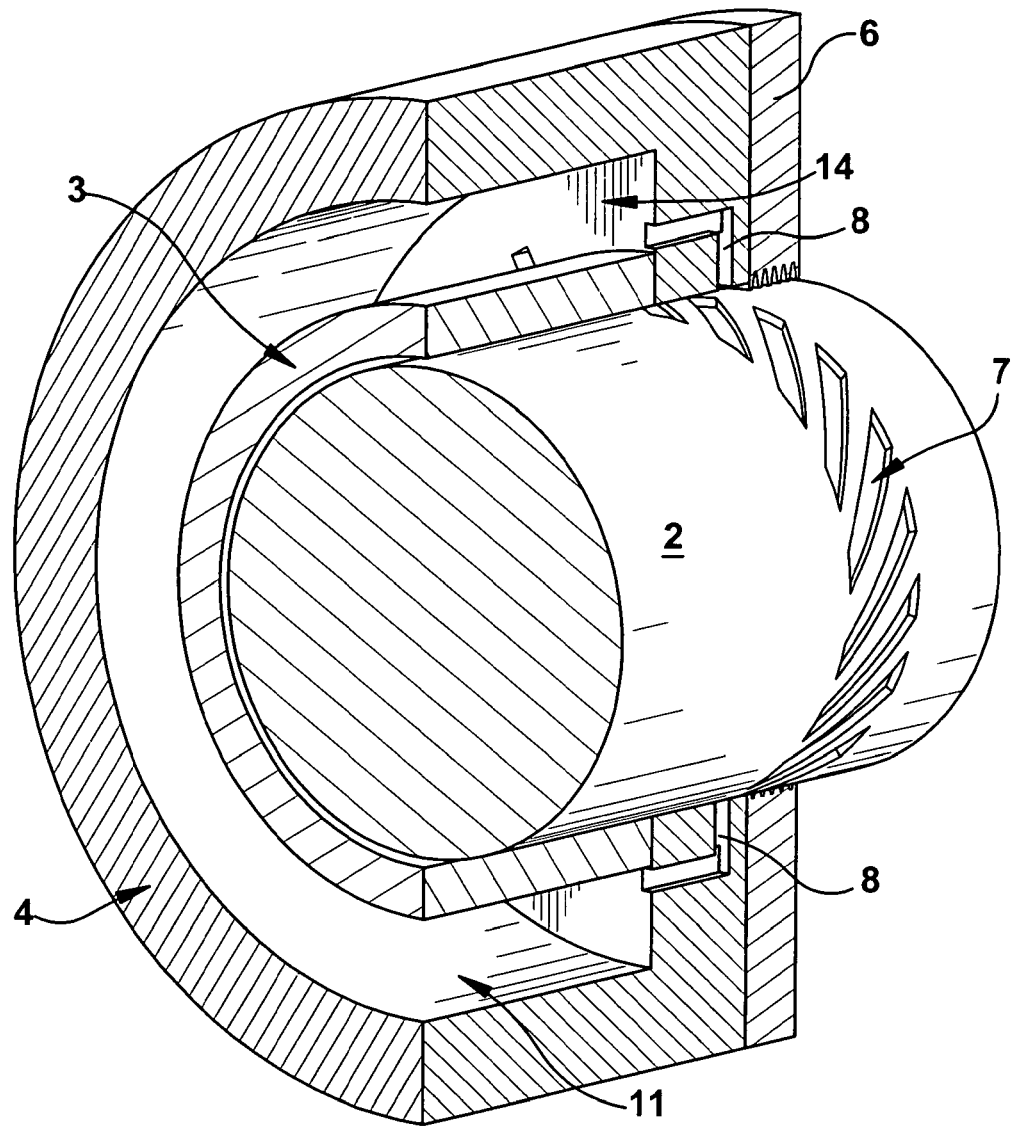
FIG. 10 is a cross sectional area of the assembly showing the circumferential view according to the invention.
Figure 11:
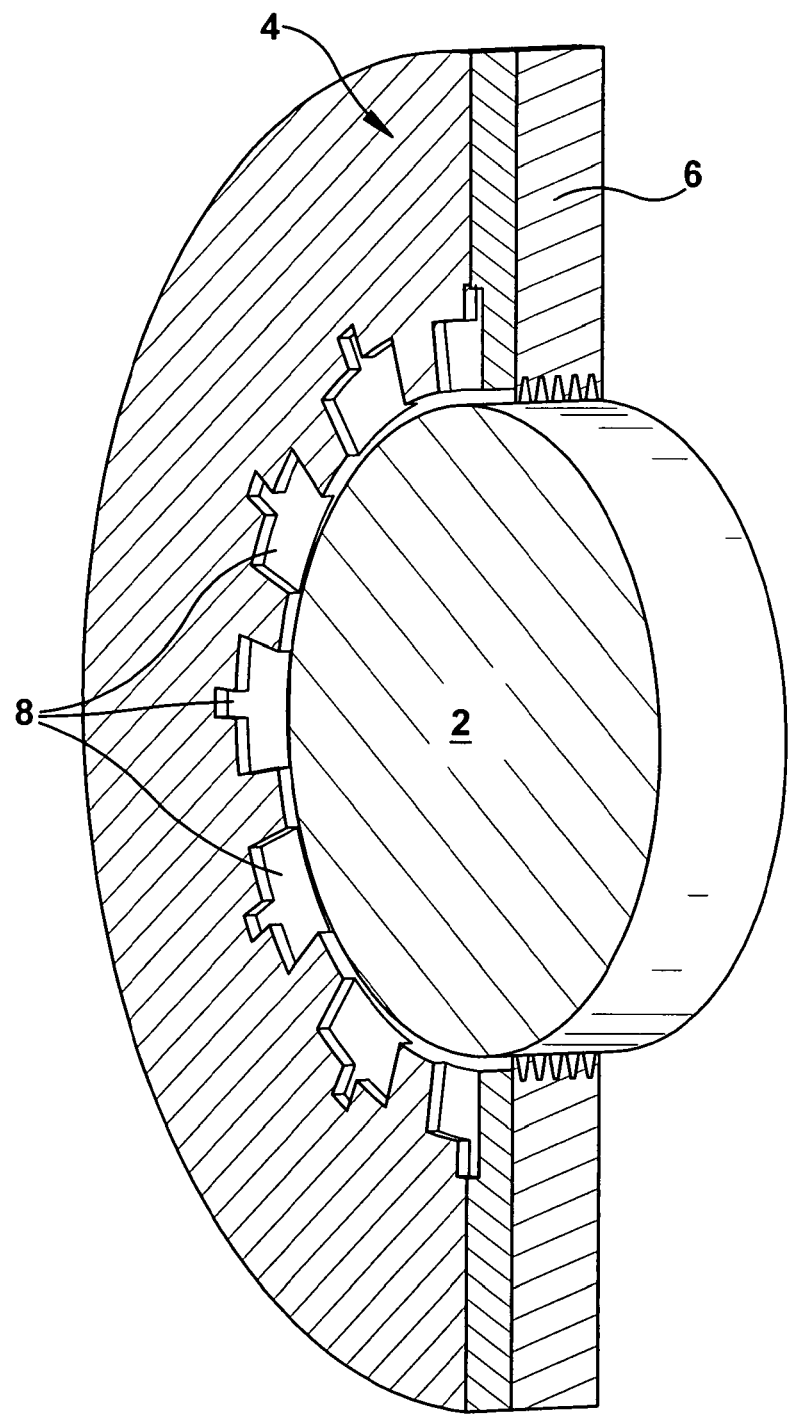
FIG. 11 is a cut-away illustrating the collecting manifolds in a bearing according to the invention.

The two elements 6 that complete the bearing assembly represent labyrinth seals that are meant to prevent any liquid that escaped the action of the HGS grooves 7 and collecting manifolds 8 from leaking out of the bearing. FIG. 10 shows more clearly the fluid return passage through manifolds 8 along path 14 that allows any axially leaking fluid to be pumped back by the HGS 7 into the passive space/reservoir 11. The bearing system, when assembled, is encased by stationary housing 4 which supports the porous medium 3 and also creates the outer wall of the reservoir 11.

As is stated hereinabove, the paste-like solid gallium residing in the reservoir and in the porous medium becomes liquid at 29.9° C. This can be easily achieved with an inductive resistance. A film of gallium that forms between the shaft and the porous medium also becomes liquid as the operational temperature of the system increases first due to the electrical resistance and thereafter due to frictional heat dissipation. As the shaft rotates, producing heat in response to friction, the gallium, which has a high boiling point, maintains a liquid state. Further, its viscosity decreases significantly with the increasing temperature. With reference to FIGS. 2 and 3, it is seen that under the shaft load, due to its eccentricity, the hydrodynamic gallium film takes a convergent divergent profile creating a circumferential hydrodynamic pressure that reaches a maximum near the minimum clearance in the convergent region and a minimum in the maximum clearance, as discussed above. The eccentric shaft acts like a cam pump as maximum pressure is created in the axially central and circumferentially convergent regions of the bearing. As a result, the fluid tends to run out either axially due to the axial negative pressure gradient, or radially through the porous medium and into the reservoir. Due to continuity, momentum, and natural convection laws, the fluid is caused to circulate in the reservoir (shown in FIGS. 2 and 4) which shares the same pressure patterns as the bearing, but at different magnitudes, and then migrate through the porous medium back into the bearing in the upper zone of the reservoir, adjacent to the low-pressure zone of the bearing. In one aspect of the invention, the porous medium in this zone may exhibit a higher porosity and permeability or a smaller wall thickness to facilitate lubrication of the shaft. In this manner, a self-lubricating, self-circulating, self-acting circuit, closed and devoid of external piping and pumps, is created.

With regard to all of the foregoing Figures, the lubricating fluid that is forced outward in the axial direction encounters the inward pumping HGS seals 7 that generate a positive pressure gradient, the net effect of which is to oppose the pressure gradient generated by the bearing, and prevent the fluid from escaping axially. Any residual fluid that may escape the HGS is blocked from actually leaking out of the closed bearing system by the labyrinth seals 6. Therefore, in this aspect of the invention, a closed circuit that presents a substantially 'zero-leakage' footprint, as that term is defined earlier herein, is provided.

In addition to being a closed, self-circulating, self-acting, self-lubricating system, the bearing system according to the invention is designed to function at high temperatures, up to and including 1000-1500° C., where traditional lubricants, such as grease and oil would flash and/or ignite. The increased operational temperature of the bearings according to the invention, which take advantage of the use of liquid metal lubricants, renders them an optimum choice for applications requiring use at sustained, elevated operational temperatures in excess of 1000° C. Such applications may include, but are not limited to, higher performance jet engines, power turbines, rocket engines, automotive, and other aeronautic and industrial uses.

Figure 12:
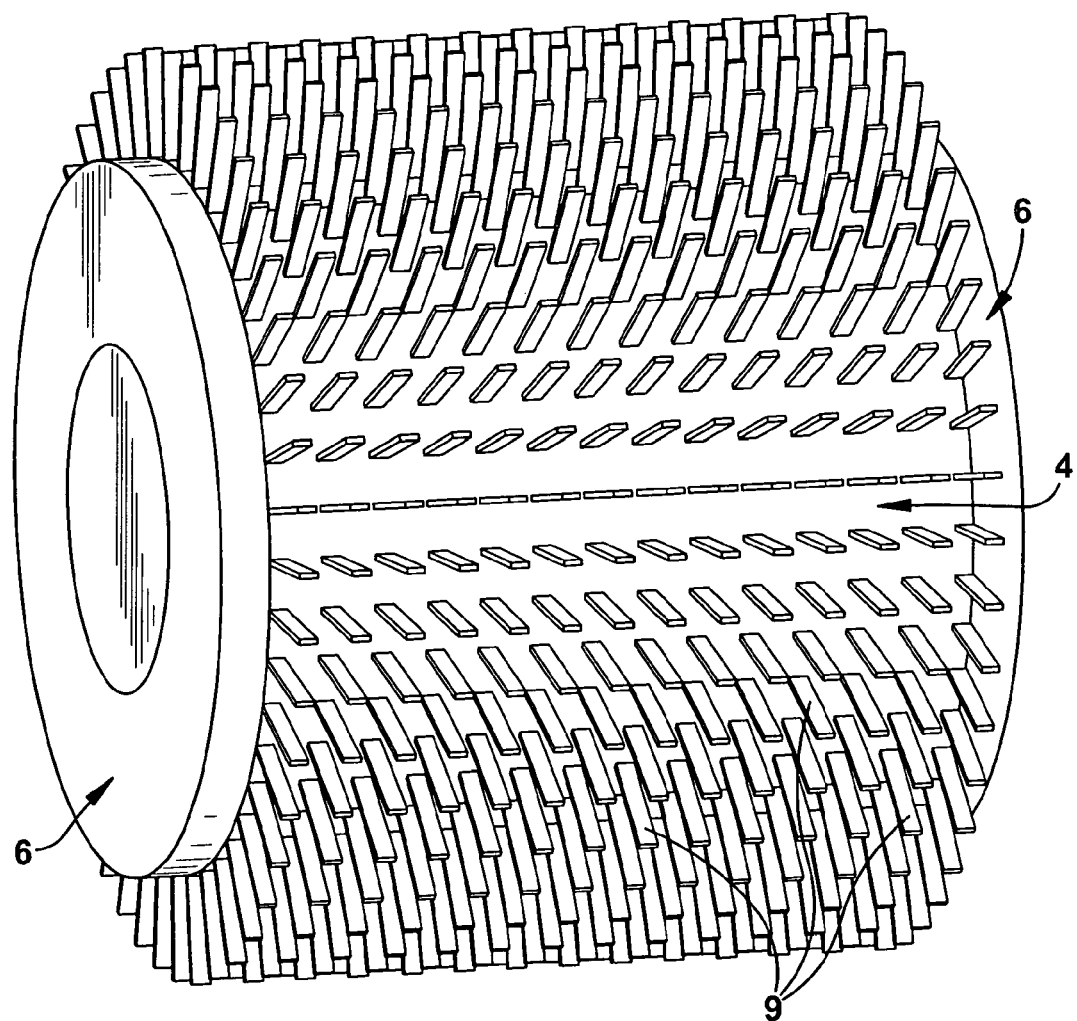
FIG. 12 is an illustration of a bearing according to the invention with the inventive heat sink surrounding the reservoir.
Figure 13:
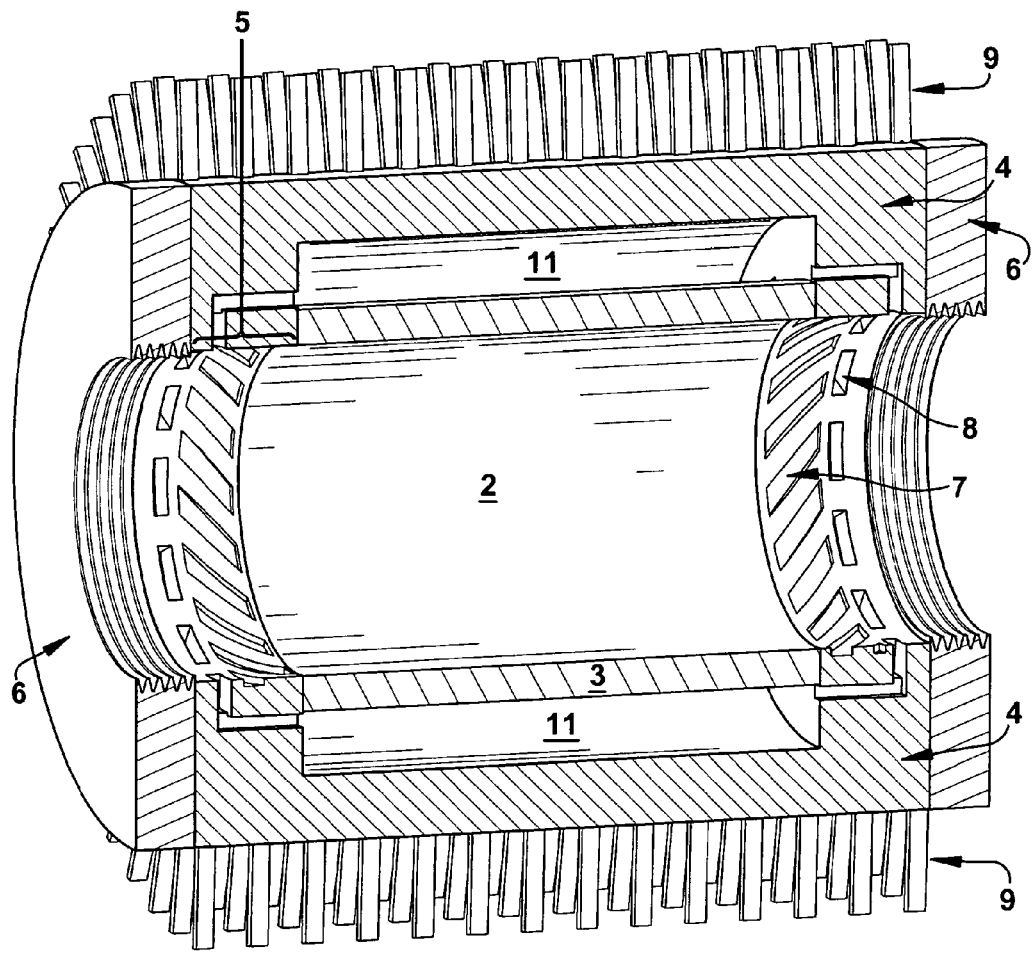
FIG. 13 is a longitudinal, exploded cut-away illustrating a bearing system according to the invention with the inventive heat sink.

In still another aspect of the invention, the bearing system is self-cooling. Because the lubricating fluid in the system circulates in a closed circuit, the thermal conditioning, i.e. cooling of the fluid, is essential to the proper operation of the device. This may be true even for gallium, which can sustain operating temperatures as high as 2204° C. The removal of the prior art external piping and pump driven circulating system, while in many ways advantageous, also eliminates any chance for active cooling of the working fluid and thus the ability to control the temperature thereof. Cooling of the closed bearing circuit may be accomplished based on enhanced natural convection supported by the addition of external fins or protrusions 9, shown in FIGS. 12 and 13, added to the stationary housing 4, transforming its external surface into a heat sink. Alternatively, heat may be drawn off the system for example, by any means that increases the external surface area of the stationary housing. FIGS. 12 and 13 show just one possible configuration for increasing the surface area, i.e., the use of the external fins 9. The number and exact placement of such fins or other surface area increasing means may vary according to cooling needs. For the applications envisioned herein, the surroundings may provide a forced convection cooling environment that operates at relatively high Reynolds numbers. For example, this would be the case in a jet engine where secondary air may be used for cooling the external surface of the bearing. Therefore, large heat transfer coefficients may develop and cause the heat sink to function efficiently. The situation is facilitated by the fact that gallium liquid metal, when used as the lubricating fluid, can function over a large range of temperatures due to its very high boiling point of 2204° C.

The invention has been described with reference to various aspects thereof. Obviously, modifications and alterations will occur to others upon reading and understanding the preceding detailed description. It is intended that the invention be construed as including all such modifications and alterations.

What we claim is:

1. A method for continually circulating a fluid in a sealed, closed system in the absence of an external pumping mechanism, the method comprising:
   a) providing a sealed, closed system without an external pump or pressure-providing mechanism,
   the sealed, closed system including:
   i) an active space;
   ii) a passive space;
   iii) a porous medium disposed between the active space and the passive space, the passive space surrounding the porous medium;
   iv) a fluid filing the active space and the passive space; and
   v) a shaft, the active space being confined between the shaft and the porous medium, the shaft being under a load and in an eccentric position relative to the porous medium, the shaft defining a convergent and divergent zone in the active space; and
   b) rotating the shaft, thus generating a pressure differential relationship between the active space and the passive space causing the fluid to move out of the convergent zone of the active space and into the passive space, and then out of the passive space and into the divergent zone of the active space, thus causing the fluid to circulate freely in both directions between the active space and the passive space, across the porous medium, such that the fluid circulation defines a self-acting, self-circulating fluid system.

2. The method of claim 1 wherein the closed system is operating at a temperature of at least 1000° C. and at a rotational speed in excess of 16,000rpm.

3. The method of claim 1 wherein the fluid is a liquid metal.

4. The method of claim 3 wherein the fluid is gallium.

5. The method of claim 1 wherein the movable component moves at least one of rotationally and translationally.

6. The method of claim 1 wherein the movable component is a bearing shaft and the seal, closed system is a bearing system.

7. The method of claim 1 wherein the fluid circulates freely between the active space and the passive space in a zero-leakage manner, eliminating the need to replenish the fluid during operation of the closed system.

8. A self-acting, self-circulating closed fluid system comprising a sealed housing containing at least:
   a) a fluid;
   b) an active space having a movable component disposed therein;
   c) a passive space; and
   d) a porous medium disposed between the active space and the passive space, the passive space surrounds the porous medium, such that (a), (b), (c) and (d) cooperate to circulate the fluid continuously across the porous medium through the closed fluid system, without an external pump or pressure source, in response to movement of the movable component which causes a pressure gradient to be generated between the active space and the passive space.

9. The closed fluid system of claim 8 wherein the porous medium is isotropic.

10. The closed fluid system of claim 9 wherein the porous medium is anisotropic.

11. The closed fluid system of claim 8 wherein the system is a zero-leakage system.

12. The closed fluid system of claim 11 further comprising herringbone grooves positioned on the movable component to prevent fluid from leaking outside the closed system.

13. The closed fluid system of claim 11 further comprising herringbone grooves positioned on the housing to prevent fluid from leaking outside the closed system.

14. The closed fluid system of claim 11 further comprising at least one of collecting manifolds and labyrinth seals to prevent fluid from leaking outside the closed system.

15. A self-acting, self-circulating closed bearing system comprising:
   a) an enclosure having a shaft residing therein, the enclosure comprising a porous medium;
   b) an active space defined between a surface of the enclosure facing the shaft and a surface of the shaft facing the enclosure;
   c) a reservoir contiguous to and surrounding the enclosure and defining a passive space; and
   d) a lubrication fluid residing in the active space and in the passive space that passes through the porous medium in both directions in response to a pressure gradient between the active space and the passive space, the pressure gradient generated by movement of the shaft;
   the self-acting bearing system being devoid of an external pressure source.

16. The self-acting, self-circulating closed bearing system of claim 15 wherein the shaft is at least one of a rotating shaft and a translating shaft.

17. The self-acting, self-circulating closed bearing system of claim 15 wherein the porous medium is isotropic.

18. The self-acting, self-circulating closed bearing system of claim 15 wherein the porous medium is anisotropic.

19. The self-acting, self-circulating closed bearing system of claim 15 wherein the fluid is a liquid metal composition.

20. The self-acting, self-circulating closed bearing system of claim 19 wherein the liquid metal composition contains gallium.

21. The self-acting, self-circulating closed bearing system of claim 15 wherein the system operates at temperatures of at least 1000° C.

22. The self-acting, self-circulating closed bearing system of claim 15 wherein the system operates a 16,000 rpm and above.

23. The self-acting, self-circulating closed bearing system of claim 15 wherein the system further includes a heat sink as a cooling mechanism.

24. The self-acting, self-circulating closed bearing system of claim 23 wherein the heat sink comprises protrusions on the exterior surface of the enclosure to increase the surface area thereof.

* * * * *